(12) United States Patent
Shukla et al.

(10) Patent No.: US 8,533,036 B2
(45) Date of Patent: Sep. 10, 2013

(54) REWARDS BASED CURRENCY PROCESSING SYSTEM

(75) Inventors: Anuradha Shukla, Fremont, CA (US); Vasanthi Chandrasekaram, Palo Alto, CA (US)

(73) Assignee: RewardsPay, Inc., Mountain View, CA (US)

( * ) Notice: Subject to any disclaimer, the term of this patent is extended or adjusted under 35 U.S.C. 154(b) by 0 days.

(21) Appl. No.: 13/272,169

(22) Filed: Oct. 12, 2011

(65) Prior Publication Data

US 2012/0095820 A1    Apr. 19, 2012

Related U.S. Application Data

(60) Provisional application No. 61/392,629, filed on Oct. 13, 2010.

(51) Int. Cl.
*G06Q 30/00* (2012.01)

(52) U.S. Cl.
USPC ................. 705/14.28; 705/14.33; 705/14.27; 705/14.38

(58) Field of Classification Search
USPC ...................................................... 705/14.33
See application file for complete search history.

(56) References Cited

U.S. PATENT DOCUMENTS

| | | | |
|---|---|---|---|
| 7,765,124 B2 | 7/2010 | Postrel | |
| 2006/0248007 A1* | 11/2006 | Hofer et al. | 705/40 |
| 2008/0077498 A1* | 3/2008 | Ariff et al. | 705/14 |
| 2009/0192890 A1 | 7/2009 | Steinkamp et al. | |
| 2010/0179869 A1 | 7/2010 | Hofer et al. | |

OTHER PUBLICATIONS

PCT International Search Report and Written Opinion, PCT Application No. PCT/US11/56218, Jan. 5, 2012, 10 pages.

* cited by examiner

*Primary Examiner* — John G Weiss
*Assistant Examiner* — Scott C Anderson
(74) *Attorney, Agent, or Firm* — Fenwick & West LLP

(57) ABSTRACT

To execute an ecommerce purchase transaction between a customer and merchant using rewards points made available to the customer through a rewards program provider, a system executes a transaction with the merchant and the rewards program provider. The system receives a customer request to execute the purchase using rewards points. Additionally, the system retrieves customer reward points information responsive to a customer authorization and determines a redemption rate for redeeming the rewards points to transaction currency. The system executes a redemption transaction with the rewards program provider, thereby receiving transaction currency in exchange for released points. The system also executes a transaction with the merchant, purchasing one or more customer selected item on behalf of the customer using transaction currency. Finally, the system provides the user with updated reward points account information.

20 Claims, 13 Drawing Sheets

REWARDS BASED CURRENCY PROCESSING SYSTEM

CROSS REFERENCE TO RELATED APPLICATIONS

This application claims the benefit of U.S. Provisional Application No. 61/392,629, filed Oct. 13, 2010, which is incorporated by reference in its entirety.

BACKGROUND

1. Field of Art

The disclosure generally relates to the field of electronic commerce.

2. Description of the Related Art

Rewards or loyalty programs associated with purchase of goods or use of certain payment sources have become commonplace. For example, several airline operators offer loyalty miles for flying with the operator which can be redeemed or used towards another flight operated by the same carrier. Credit card companies such as Discover Inc. or American Express Inc. offer loyalty points for each dollar spent using their credit card. Additionally, each rewards or loyalty points program also operates a redemption store. Redemption stores generally allow customer (or user) with accumulated points to redeem their points in exchange for one or more items.

Loyalty program providers generally offer reward programs to retain their customer base and increase customer engagement with the program provider. However, loyalty program customers often cannot redeem their points because the customers may lack sufficient points for a particular item, the rewards program operator may not offer items the customers want or the customers may not know how to redeem their points. Thus a large amount rewards points offered through rewards programs or loyalty programs remain unclaimed and unused. Additionally, the process of redemption is generally cumbersome; it requires customers to track points, redemption rates, expiration dates associated with the points and redemption stores. Over time, the customers often become dissatisfied with the cumbersome redemption process, which reduces the perceived value of the loyalty points. Thus, the loyalty program operators are generally unsuccessful in increasing customer engagement with the rewards program or retaining a customer base.

For loyalty program operators the experience also can be less than satisfactory. Loyalty program operators are often forced to carry a balance roughly equivalent to the market value of the outstanding loyalty points on their balance sheets, through the use of loyalty reserve accounts. Loyalty reserve accounts represent real liability and not contingent liability. Thus, the loyalty program operators are forced to carry funds which could otherwise be used for other business objectives such as marketing, business development, etc. Accordingly, loyalty program operators attempt to move these redemption points off their operating balance sheet as fast as possible, but must be careful not to raise the ire of their customer base.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Configuration Overview

Figure 1:
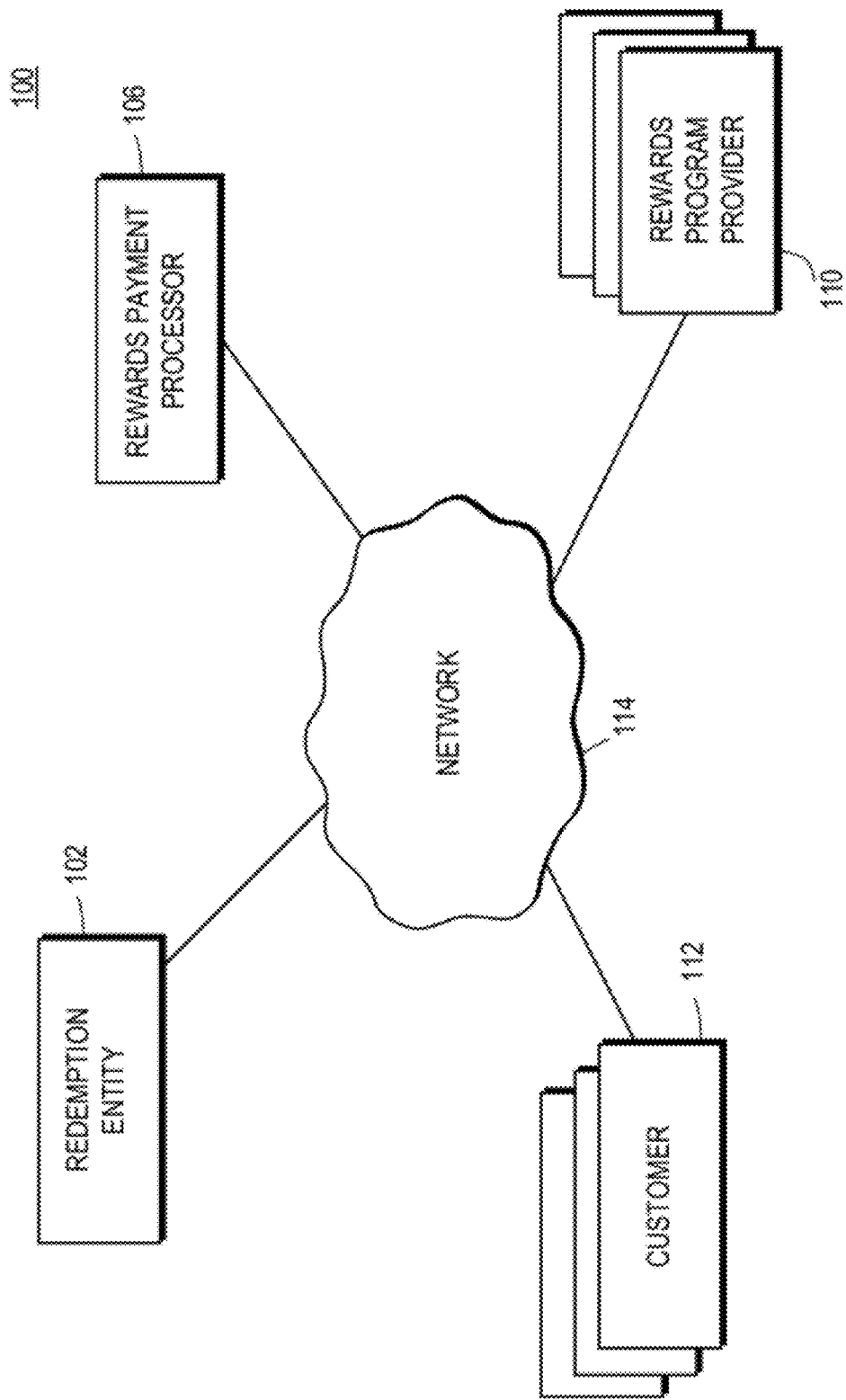
FIG. 1 is a high-level block diagram that illustrates a computing environment for redeeming rewards points according to one embodiment.

FIG. 1 is a high-level block diagram that illustrates a computing environment 100 for redeeming an item using loyalty points according to one embodiment. As shown, the computing environment 100 includes a redemption entity 102, a rewards payment processor 106, a rewards program provider 110 and a customer 112 connected through a network 114. It is noted that each of these entities is configured to include computing and network architecture to facilitate communications between them corresponding to the functionality described herein.

At a high level, the redemption entity 102 offers real or virtual goods for sale. The rewards payment processor 106 redeems a customer's loyalty points for a value based on a redemption rate. Additionally, the rewards payment processor 106 executes a transaction with the redemption entity 102 or on behalf of the customer 112 to purchase one or more real or virtual goods offered by the redemption entity 102 and selected by a customer 112. Thus, a customer is enabled to purchase an item offered by a plurality of redemption entities using loyalty points associated with a rewards program provider 110. In one embodiment, a third party broker provides a payment system that facilitates transactions with the redemption entity 102 and rewards program provider 110.

The network 114 represents the communication pathways between the customer 112, redemption entity 102, rewards program provider 110 and rewards payment processor 106. In one embodiment, the network 110 is the Internet. The network 114 can also utilize dedicated or private communications links that are not necessarily part of the Internet. In one embodiment, the network 114 uses standard communications technologies and/or protocols. Thus, the network 114 can include links using technologies such as Ethernet, Wi-Fi (802.11), integrated services digital network (ISDN), digital subscriber line (DSL), asynchronous transfer mode (ATM), etc. Similarly, the networking protocols used on the network 114 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), long term evolution (LTE), code division multiple access 2000 (CDMA2000), and/or wide-band CDMA (WCDMA). The data exchanged over the network 114 can be represented using technologies and/or formats including the hypertext markup language (HTML), the extensible markup language (XML), the wireless access protocol (WAP), the short message service (SMS) etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The redemption entity 102 offers physical and/or virtual goods for sale and/or services for sale. In an embodiment, the redemption entity 102 includes but is not limited to a publisher of a web page, a merchant, a social network, a game publisher, a virtual world publisher, an e-commerce provider, a news articles provider, etc. A publisher is an entity that provides web pages and/or other electronic documents to customers 112. The publisher can be, for example, a major Internet web site operated by a national media outlet, a personal blog on a web server operated by a lone individual, and/or another distributor of web pages. This description uses the term "web page" to refer to any electronic document served by a publisher, regardless of whether the document is technically a web page.

A merchant is any entity that sells items on the network 114 or makes items available through other types of electronic commerce (ecommerce) transactions. In one embodiment, the merchant offers items for sale by advertising or offering the items on a publisher web page. A social network includes any social networking system where users can form connections with others. Examples of some social networking systems include FACEBOOK, LINKED-IN, MYSPACE, etc. A game publisher includes but is not limited to any entity that offers or serves games for a user to play within a website or on a personal computing device, such as ZYNGA, AMERICA ONLINE, etc. A virtual world publisher provides a system where users can operate within and interact with virtual elements and other users. Examples include, but not limited to SECOND LIFE, SMALLWORLDS, ONVERSE, etc. The redemption entity 102 offering an item to the buyer is sometimes referred to as the "seller" and the transaction is sometimes referred to as a "sale" or "purchase." As used herein, these terms also refer to other types of transactions, regardless of whether the redemption entity 102 is technically a "seller" or the transaction is technically a "sale." Moreover, the transaction currency can be monies or can be a currency corresponding to reward type programs, for example, points or credits. Although FIG. 1 illustrates only one redemption entity 102 embodiments of the present invention can have many participating redemption entities 102.

The customer 112 is an entity that can execute a transaction with a redemption entity 102. In one embodiment, the customer 112 receives web pages or other offers from redemption entities 102 and optionally purchases items by interacting with those pages. In other embodiments, the customer 112 can execute a purchase transaction with a redemption entity by interacting with a social networking system, a virtual world, a video game or other redemption entities 102. The customer 112 is sometimes referred to as the "buyer" and the transaction is sometimes referred to as a "sale" or "purchase." As used herein, these terms also refer to other types of transactions, regardless of whether the customer 112 is technically a "buyer" or the transaction is technically a "purchase." In addition, this description sometimes uses the term "customer" to refer to a potential customer that has not yet expressed an interest in purchasing an item.

In one embodiment, the customer 112 includes a computer system utilized by an end-customer to communicate with other computers on the network 114 in order to effect a purchase. In one embodiment, the customer 112 can use loyalty points associated with the customer 112 and offered by a rewards program provider 110 to purchase an item offered by a redemption entity 102. As described in greater detail below, the rewards payment processor 106 executes such a transaction by interacting with a rewards program provider 110 and the redemption entity 102 in response to the customer 112 request. In other embodiments, the customer 112 includes a network-capable device other than a computer system, such as a smartphone, a personal digital assistant (PDA), a cellular telephone, a pager, a television "set-top box" etc. As shown in FIG. 1, disclosed embodiments can have thousands or millions of customers 112 connected to the network 114.

A rewards program provider 110 represents an entity that offers a rewards program or points which can be redeemed for one or more services or goods. Examples of rewards program providers 110 include AMERICAN EXPRESS MEMBER REWARDS, VISA REWARDS PROGRAM, DISCOVER POINTS, DELTA REWARDS, HILTON HONORS, BANK OF AMERICA WORLD POINTS, STARWOOD REWARDS, THANK YOU NETWORK, etc. A rewards program provider 110 awards rewards points or loyalty points to its members, herein also referred to as customers 112 for engaging in certain activities. The activities can range from, for example, using an AMERICAN EXPRESS credit card to execute a purchase, or using a STARWOOD REWARDS identification number to purchase a hotel room with a partner hotel. The type of reward can vary from accumulating points to accumulating cash or cash equivalents. Typically, a customer 102 maintains a membership with several rewards program providers 110 at a given time. In one embodiment, the rewards program provider 110 maintains a server to store and update the number of points associated with each customer 102. As shown in FIG. 1, disclosed embodiments can have many participating rewards program providers 110.

A rewards payment processor 106 represents an entity that executes a transaction with a rewards program provider 110 and with a redemption entity 102 responsive to a customer 112 request. In one embodiment, the rewards payment processor 106 communicates with rewards program provider 110 to determine the amount of loyalty points associated with a customer 112. Additionally, the rewards payment processor calculates a redemption rate to redeem the rewards program provider's loyalty points to a transaction currency. A transaction currency is any currency in which the redemption or exchange transaction is settled between the parties. For example, the redemption transaction can be settled using United States Dollars (USD), Euros, British Pound etc. The rewards payment processor 106 also communicates with the merchant to determine the purchase price of one or more items, responsive to a customer 112 selection. The rewards payment processor 106 executes a transaction with the rewards program provider 110 for at least an amount requested by the customer 112 or indicated by a purchase price. Additionally, the rewards payment processor 106 executes a transaction with the merchant for an amount indicated by the customer 112 or the redemption entity 102.

The system described herein provides a customer 112 opportunities to earn loyalty points associated with one or more rewards program providers 110. In one embodiment, the customer 112 executing a transaction using loyalty points is presented with an opportunity to earn additional points during the execution of the transaction. For example, a user being sent paper bills can be offered an opportunity to switch to paperless billing to earn additional loyalty points. In another embodiment, a rewards program provider 110 provides an advertisement allowing the user to earn double rewards points if the customer purchases a stay with a partner hotel network. The additional earning opportunities operate in conjunction with loyalty program provider 110 targeting criteria, described in greater detail below in reference to FIG. 3.

Additionally, the system described herein allows a customer 112 to execute a purchase of one or more items available through a redemption entity 102 web page by using the loyalty points available to the customer 112 through a rewards program provider 110. The system allows for a rewards payment processor 106 to interact with a redemption entity 102, a rewards program provider 110 and the customer 112 to enable the transaction. Thus, the disclosed embodiments provide a seamless system for a customer to use loyalty points associated with the customer 112 to execute a purchase on item offered by a virtually unlimited number of merchants on the network 114.

Figure 2:
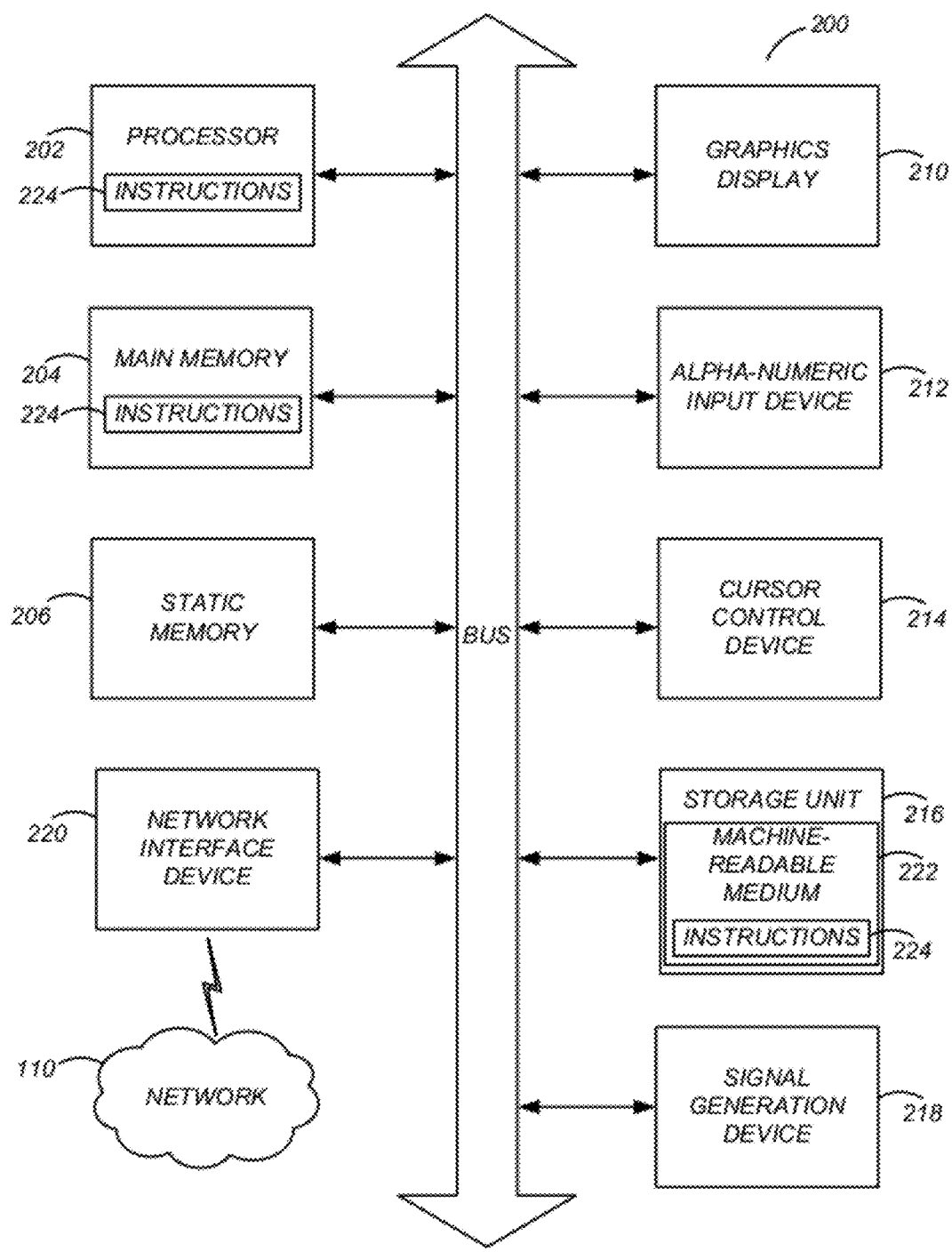
FIG. 2 is a high-level block diagram illustrating a functional view of a typical computer system for use as one of the entities illustrated in the environment of FIG. 1 according to one embodiment.

FIG. 2 is a high-level block diagram illustrating a functional view of a typical computer system 200 for use as one of the entities illustrated in the environment 100 of FIG. 1 according to one embodiment. It is noted that the computing machine 200 may also be a system or part of a system, e.g., two or more machines operating together or one or more machines operating with one or more other devices.

FIG. 2 illustrates components of an example machine able to read instructions from a machine-readable medium and execute them in one or more processors and/or controllers. Specifically, FIG. 2 shows a diagrammatic representation of a machine in the example form of a computer system 200 within which instructions 224 (e.g., software code) for causing the machine (e.g., having the one or more processors and/or controllers) to perform anyone or more of the methodologies discussed herein may be executed, for example, by the redemption entity 102, the rewards payment processor 106, the rewards program provider 110, or a computing system of the customer 112. In alterative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform anyone or more of the methodologies discussed herein.

The example computer machine 200 includes a processor 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 108. The computer system 200 may further include graphics display unit 210 (e.g., a plasma display panel (PDP), a liquid crystal display (LCD), a projector, or a cathode ray tube (CRT)). The computer system 200 may also include alphanumeric input device 212 (e.g., a keyboard), a cursor control device 214 (e.g., a mouse, a trackball, a joystick, a motion sensor, or other pointing instrument), a storage unit 216, a signal generation device 218 (e.g., a speaker), and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over the network 110 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

System Architecture

Figure 3:
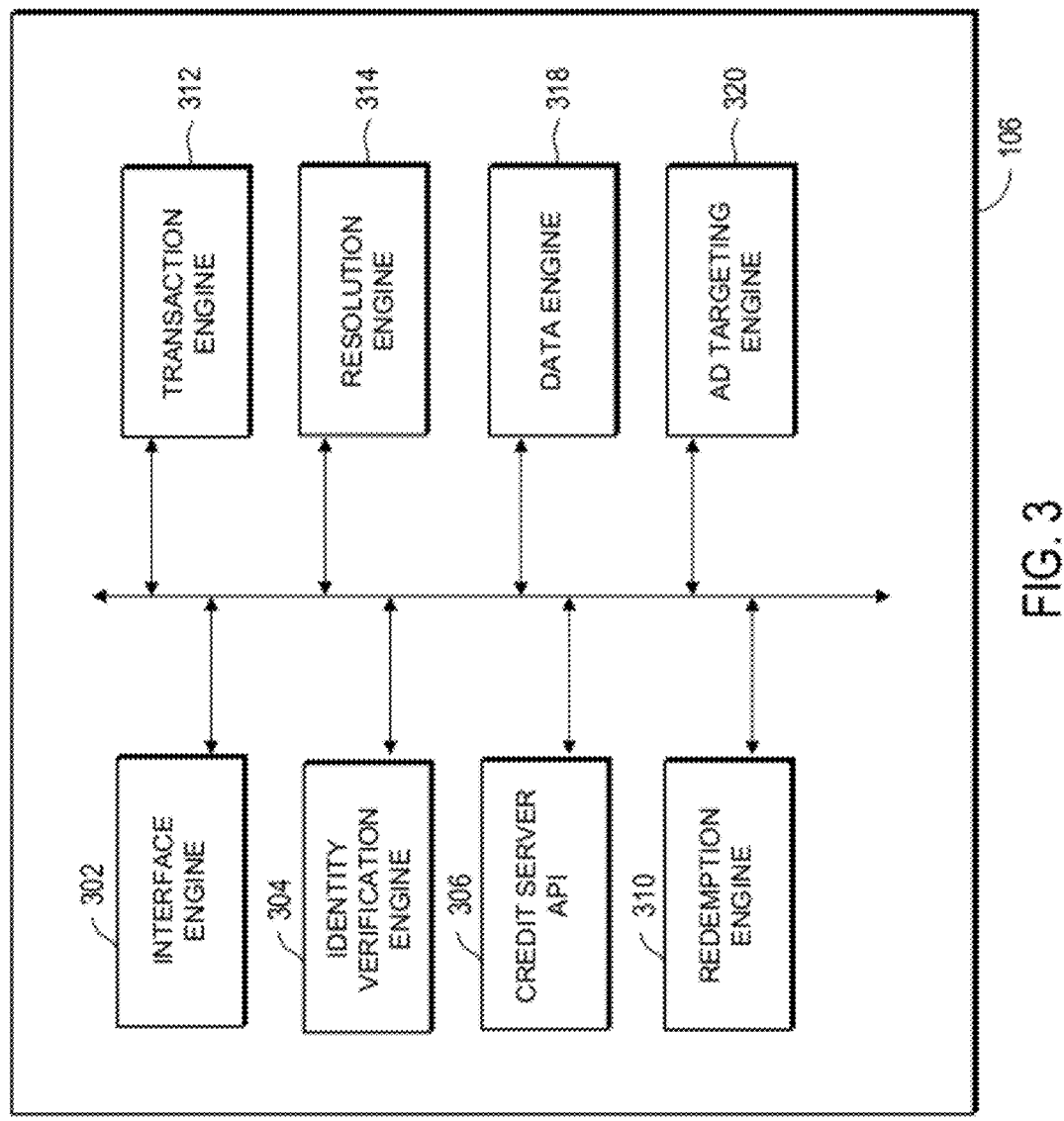
FIG. 3 is a high-level block diagram illustrating a detailed view of engines within an rewards payment processor for redeeming rewards points according to one embodiment.

FIG. 3 is a high-level block diagram illustrating engines within a rewards payment processor 106 according to one embodiment. As shown in FIG. 3, the rewards payment processor 106 includes an interface engine 302, an identity verification engine (or module) 304, a credit server API 306, an redemption engine 310, a transaction engine (or module) 312, a resolution engine 314, a consumer profile engine (or module) 316, a data engine (or module) 318 and an ad targeting engine (or module) 320. Those of skill in the art will recognize that other embodiments can have different and/or other engines than the ones described here, and that the functionalities can be distributed among the engines in a different manner.

The interface engine 302 communicates with the redemption entity 102, the rewards program provider 110 and the customer 112. In one embodiment, the interface engine 302 provides the redemption entity 102 with a listing of rewards program providers 110 enabled to redeem loyalty points. Additionally, the interface engine 302 receives communication from the redemption entity 102 indicating a customer selection of one or more rewards program providers 110 for executing a purchase. The interface engine 302 may also receive particular customer information if the customer 112 has created an account with the redemption entity 102 and has provided information such as name or account number. In one embodiment, the interface engine 302 receives promotions and the promotion targeting criteria offered by the rewards program provider 110. In such an embodiment, the interface engine 302 provides the promotional information to the customer 112 if the customer meets the targeting criteria. In another embodiment, the interface engine 302 communicates with the redemption entity 102 to obtain the purchase price of an item selected by a customer. In other embodiments, all communication with the redemption entity 102 is routed through the interface engine 302.

The identity verification engine 304 determines and verifies the identities of rewards program providers 110, redemption entities 102 and a customer 112. Verification can be done by prompting a customer 112 to provide a customer name and password for an account established with the rewards payment processor 106. Verification can also be done by requesting a customer 112 to provide an email and sending a verification email to the provided email address. In other embodiments, verification can also be done by prompting customer 112 to provide certain personal information such as an account number with the rewards program provider 110. For example, the user's credit card number and other verification details associated with the credit card may be used to verify the user. Similarly, a user's account number and password associated with a redemption entity 102 may be used to verify the user. FACEBOOK CONNECT is one example of a system wherein a user can provide an account number and password to verify his or her identity. In other embodiments, verification is also done by comparing certain customer provided answers with customer provided answers that the customer 112 supplied when creating an account. In other embodiments, methods known in the art, such as geo tagging, machine fingerprinting methods such as machine binding IP address verification may also be used by the verification engine 304 to establish the identity of each customer 112.

Additionally, the verification engine 304 verifies the identities of rewards program providers 110. For example, if a customer 112 selects a rewards program provider 110 to redeem loyalty points and execute a purchase transaction, the identity verification engine 304 determines the good standing of the rewards program provider. In one embodiment, the verification is performed by accessing data in a lookup table. In another embodiment, verification is performed by executing a dummy redemption transaction with the rewards program provider 110.

The credit server application program interface (API) 306 provides an API that uses information stored by or provided by a rewards program provider 110. The API can provide access to all the stored data associated with a rewards program provider 110 account, such as the number of loyalty points available, the number of points that can be redeemed for executing a purchase, the number of points that are available at particular hi-peak and low-peak times. An application using the API can access this data and analyze it and present it in various ways through the interface engine 302. The API can also include functions for accessing the customer interface and functions for placing and receiving phone calls and text messages.

The redemption engine 310 calculates a total cost associated with the execution of a transaction. In one embodiment, the transaction includes the purchase price of one or more items marked for purchase by the customer. In other embodiments, the transaction includes the purchase price of one of many items selected by the user. Transaction cost can also include the shipping costs associated with one or more items selected by the user either in conjunction with or separate from the purchase price. In one embodiment, the redemption engine retrieves the redemption rate associated with the redemption of loyalty points selected by the customer 112. A redemption rate or the exchange rate is the rate for redeeming loyalty points for a value. Additionally, the redemption engine 310 determines additional costs and fees associated with the transaction. In such an embodiment, the redemption engine 310 determines the total cost of the transaction and determines the number of loyalty points required to execute the transaction as selected by the customer 112. The redemption engine 310 is described in greater detail below in reference to FIG. 4. In one embodiment, the redemption engine 310 receives a redemption rate from the rewards program provider 110. In another embodiment, the redemption engine 310 performs a look-up operation in a tiered table based on price ranges as described in the specification in refrence to FIG. 4.

The transaction engine 312 supports electronic commerce (e-commerce or ecommerce) transactions involving the redemption entity 102 and the rewards program provider 110. In one embodiment, the transaction engine 312 interacts with the redemption entity 102 over the network 114 to facilitate purchase of goods or services by customers 112. For example, the transaction engine 312 sends the redemption entity 102 payment source data, such as banking account or routing data in reference to a particular item SKU or for recurring payments for renewing subscriptions, etc. Additionally, the transaction engine 312 interacts with the rewards program provider 110 to redeem loyalty points in exchange for goods purchased.

The resolution engine 314 updates loyalty points associated with each customer 112, rewards program provider 110 and redemption entity 102. After completing the redemption transaction with the rewards program provider 110 or the purchase transaction with the redemption entity 102, the resolution engine 314 updates the available loyalty points associated with the customer by updating the rewards program provider 110 and the customer 112. In one embodiment, the resolution engine 314 aggregates loyalty points data for a customer 112 from several rewards program providers 110. In one embodiment, the aggregated data is included in a web page and provided to a customer 112. In another embodiment, the resolution engine 314 provides loyalty points reports and analytics to the redemption entity 102. Additionally, the resolution engine determines loyalty points usage associated with each rewards program provider 110. For example, the resolution engine determines conversion rates, the number of points redeemed by customers 112 and additional data associated with redemption. In one embodiment, the data is communicated to the rewards program provider 110 by the interface engine 302. In one embodiment, the resolution engine also generates analytics associated with each redemption entity 102. For example, the resolution engine 314 updates redemption data associated with each redemption entity and provides the updated records to the redemption entity. The resolution engine 314 is described in greater detail in reference to FIG. 5.

The data engine 318 determines customer 112 preferences based on computing behavior. The data engine 318 tracks customer behavior through the use of cookies. In another embodiment, the data engine 318 determines customer preferences based on the information provided by the customer 112. In another embodiment, customer behavior and preferences are determined based on the products the customer has purchased in the past across the network of merchants and rewards points redeemed with many providers. In another embodiment, the data engine provides survey questions to the customer 112 to determine customer preferences.

In one embodiment, the data engine 318 detects available data to determine anomalies associated with ecommerce fraud. For example, if several payment systems associated with a customer 112 are used within a short period of time, the data engine 318 can notify the payment system such as a credit card provider of the identified fraud possibility. The data engine 318 can also place a temporary freeze on the use of loyalty points associated with the customer 112 in such an embodiment. In other embodiments, fraud detection systems known in the art can be used by the data engine 318 to detect anomalies and determine the possibility of a fraudulent transaction.

The ad (or advertisement) targeting engine 320 generates advertisements (or ads) or publishes ads that a customer 112 is likely interested in. The ad targeting engine 320 receives data on customer 112 behavior and likely customer preferences from the data engine 318. The ad targeting engine 320 receives a plurality of ads from redemption entities 102 and rewards program providers 110. In another embodiment, the ad targeting engine 320 generates advertisements responsive to auction bids received from advertisers seeking to purchase advertisements. In one embodiment, the ad targeting engine 320 uses a managed auction model, wherein the bids are selected based on automated bids provided by the redemption entities 102 and rewards program providers 110. The automated bids can include a pre-set funding limit associated with each campaign, such that once the funding limit is reached, the ads associated with the campaign are no longer selected. In another embodiment, the ad targeting engine 320 parses the advertisements based on the items offered in the advertisement, the loyalty points offered, the redemption rate of the loyalty points offered etc. The ad targeting engine 320 matches the offers to the customer preferences as determined by the data engine 318. The ad targeting engine 320 can rank the strength of a match based on the number of matches, customer 112 CTR for particular ads, etc. For example, if a customer 112 has indicated an interest in a particular product through a customer provided 'wish-list' and the customer has loyalty rewards points with a particular rewards program provider 110, then the ad targeting engine 320 highly ranks an advertisement offering a two for one redemption rate on the use of rewards points when purchasing a product on the customer 112 'wish-list.' Other ranking methodologies may be used to rank and match advertisements with customers 112.

Figure 4:
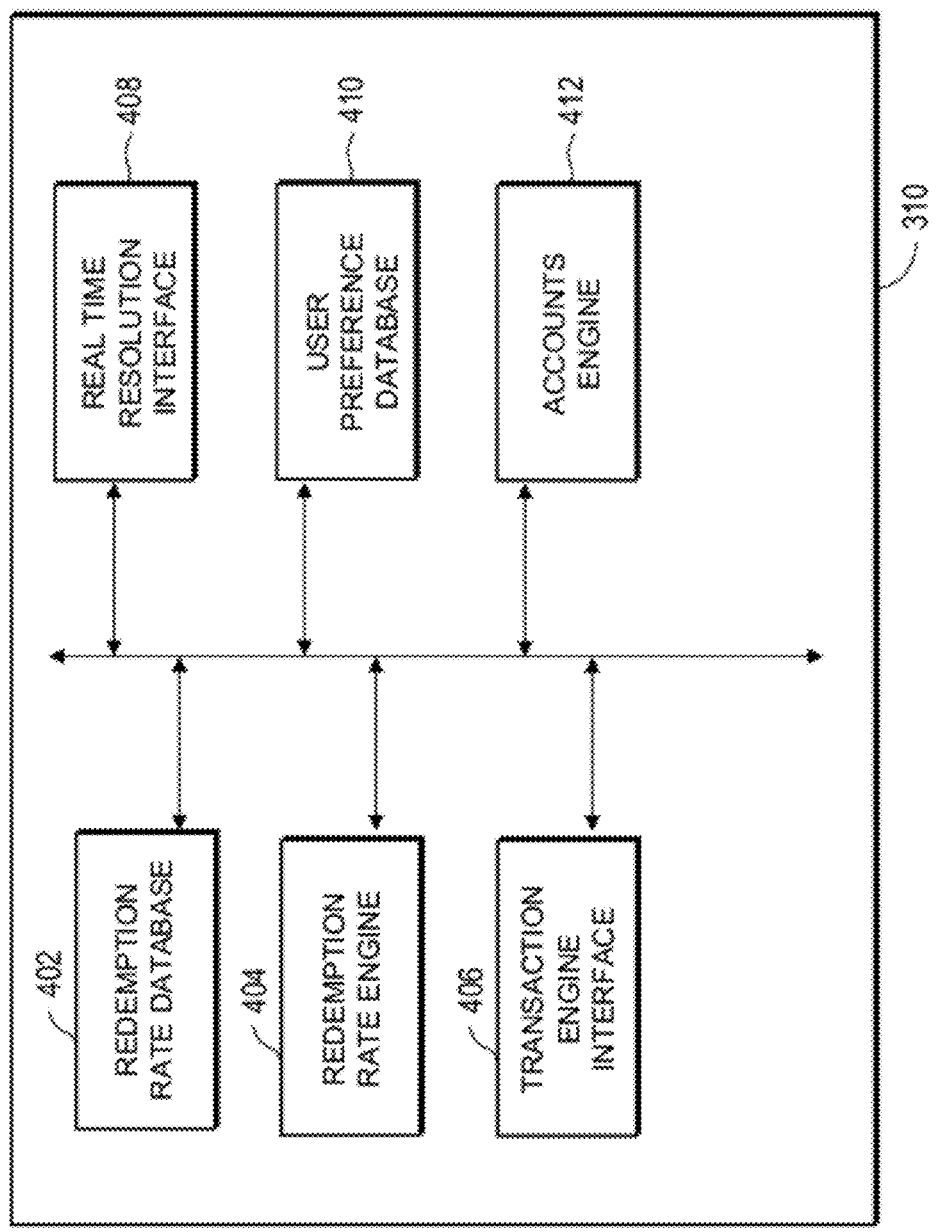
FIG. 4 is a high-level block diagram illustrating a detailed view of engines within an redemption engine according to one embodiment.

FIG. 4 is a high-level block diagram illustrating a detailed view of engines within an redemption engine 310 according to one embodiment. The redemption engine 310 comprises an redemption rate database 402, an redemption rate calculation engine 404, a transaction engine interface 406, a real time resolution interface 408 and a customer preference database 410. Those of skill in the art will recognize that other embodiments can have different and/or other engines than the ones described here, and that the functionalities can be distributed among the engines in a different manner.

The redemption rate database 402 stores and maintains a database of redemption rates for one or more rewards program providers 110. The redemption rate table may comprise the dollar value of each loyalty point offered by each rewards program provider 110. For example, if a rewards program provider 110 offers to redeem a loyalty point for one dollar, the redemption rate database provides that the monetary equivalent of the loyalty point is one dollar. In one embodiment, the redemption rate for each loyalty point program may be provided by each rewards program provider 110. In another embodiment, the redemption rate may be set by the market, and market rate is reflected in the redemption rate database. In other embodiments, the redemption rate may be set by any entity including the rewards payment processor 106. The redemption rate database 402 may be updated as when the redemption rate changes. For example, if the redemption rate, as determined by the rewards program provider 110 or set by the market is established at a particular time, the redemption rate database is not updated until either the service provider 110 sets a new redemption rate or the market establishes a new redemption rate for the loyalty point against a transaction currency. In another embodiment, the redemption rate database is updated every day or once a week based on the rewards program provider 110 and rewards payment processor 106 preferences.

In one embodiment, the redemption rate database stores multiple redemption rates for a loyalty point. For example, the redemption rate database 402 can have one redemption rate if the loyalty point is used for goods, and another redemption rate is the loyalty point is used for services. Thus, having multiple redemption rates allow rewards program providers 110 to discharge loyalty points liability at a variable rate. For example, a rewards program provider 110 can provide a more favorable redemption rate at the end of its fiscal year if it needs to remove outstanding rewards points from its balance sheets. In one embodiment, the redemption rate database contains a different redemption rate based on the geographic location of the customer or the currency requested to redeem the loyalty points. In such an embodiment, the rewards program provider 110 can provide a different redemption rate for different countries or currencies.

The redemption rate calculation engine 404 calculates the redemption rate and the total redemption cost to execute a customer 112 purchase. For example, if a customer 112 indicates a purchase for ten dollars, the redemption rate calculation engine 404 determines the redemption rates for one or more loyalty points available to the customer and the cost of exchanging each loyalty points to ten dollars. In another embodiment, the customer chooses a particular rewards program provider 110 to use. In such an embodiment, the redemption rate calculation engine 404 calculates the cost of converting the loyalty points to ten dollars. In one embodiment, the redemption rate calculation engine 404 adds additional frees and surcharges to the cost of redeeming loyalty points equivalent to ten dollars. For example, the redemption rate calculation engine may account for bank transfer fees, or a broker transaction fee, the redemption rate provider 106 fees, the rewards program provider 110 fees, etc.

The transaction engine interface 406 communicates the redemption rate and the total redemption cost as calculated by the redemption rate conversion engine 404 to the transaction engine 312. The transaction engine 312 can use the calculated redemption cost to execute a transaction with the rewards program provider. Similarly, the real time resolution interface 408 updates the resolution engine 314 the cost of transaction. Thus the customer can see in an aggregated view the available loyalty points available to the customer 112 if the customer were to execute the purchase 112 using the one or more selected loyalty points.

The customer preference database 410 stores customer 112 provided preferences in selecting a rewards program provider 110 to execute a purchase. For example, if the customer 112 requests to be notified of promotional redemption rates, then the redemption rate calculation engine 303 identifies the rewards program providers 110 offering promotional redemption rates. In other embodiments, the customer may select never to be shown an redemption rate for one or more rewards program providers 110. In such embodiment, the customer preference database 410 stores the customer preference such that one or more selected rewards program providers are not displayed to the customer 112.

The accounts engine 412 enables a customer 112 to set preferences and limits to the use of the rewards payment processor 106 account. In one embodiment, a customer can create sub-accounts, enabling other users to redeem loyalty points associated with the customer 112. For example, parents can generate a sub-account to enable their children to execute a purchase using the available loyalty points. Additionally, the accounts engine 412 receives customer spending profiles associated with each sub-account. For each sub-account, for example, the customer can provide a spending limit in dollars, the number and type of redemption entities available to the sub-account, the time frame available for redemption, the maximum number of transactions permitted per a period, such as a week or a month, a loyalty program providers 110 available to the sub-account etc. Additionally, the accounts engine 412 receives customer input indicating a transfer of loyalty points. For example, a customer can transfer or gift available loyalty points to another customer 112. Such transactions generally increase the value of loyalty points because it enables the loyalty points to be immediately redeemable by one or more users associated with the customer 112.

Figure 5:
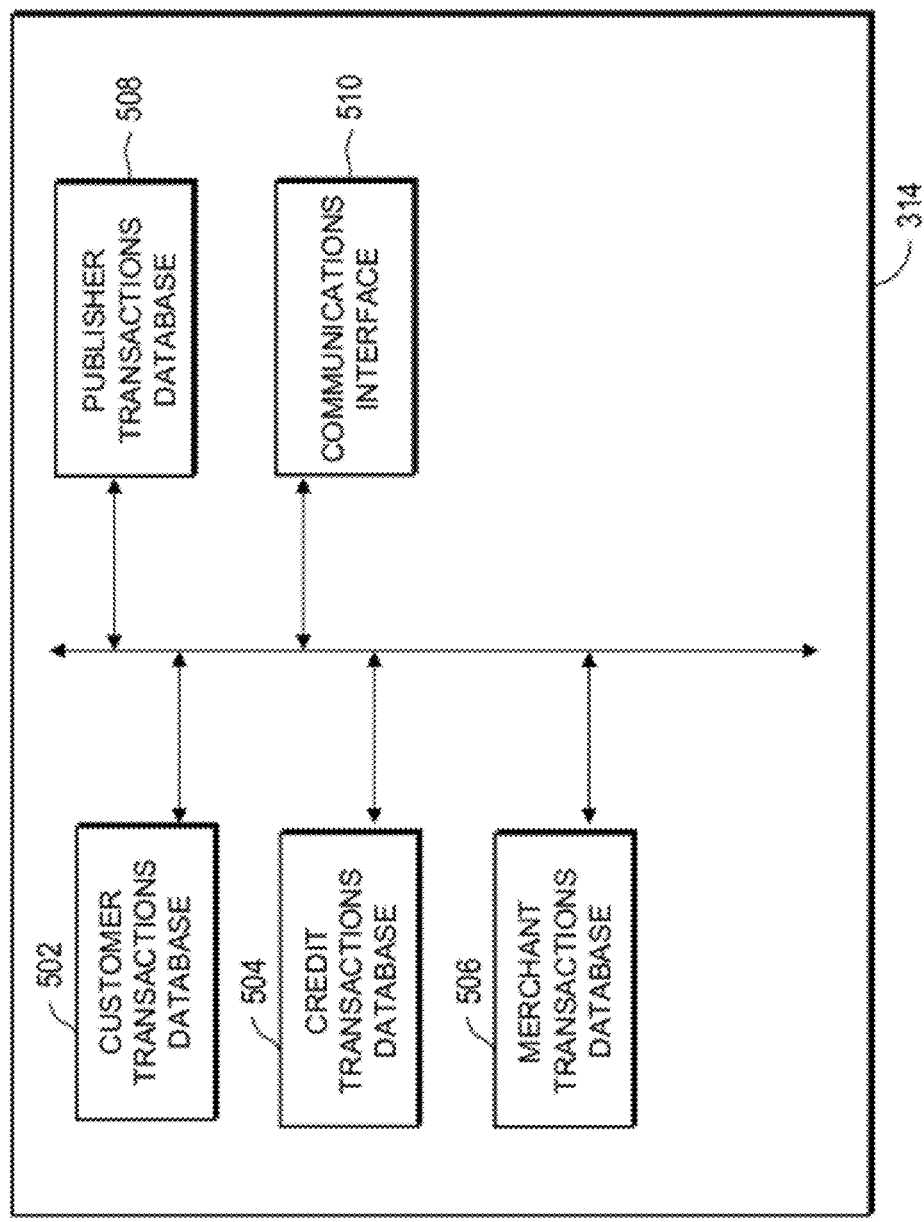
FIG. 5 is a high-level block diagram illustrating a detailed view of engines within a resolution engine according to one embodiment.

FIG. 5 is a high-level block diagram illustrating a detailed view of engines within a resolution engine 314 according to one embodiment. The resolution engine 314 comprises a customer transactions database 502, a credit service transactions database 504, a merchant transactions database 506, a redemption entity transactions database 508, a communications interface 510 and an account and billing interface 512. Those of skill in the art will recognize that other embodiments can have different and/or other engines than the ones described here, and that the functionalities can be distributed among the engines in a different manner.

The credit service transactions database 504 stores transaction information associated with each rewards program provider 110. For example, each time a customer 112 purchases a product using loyalty points provided by a rewards program provider 110, the credit service transactions database 504 is updated. Additionally, the communications interface 510 interacts with the credit server API 306 to update the credit server provider of the executed transaction. Thus, when the customer 112 executes a purchase using loyalty points, the credit service transactions database 504 along with the communications database 510 instructs the rewards program provider to remove a particular number of loyalty points from the amount of points available to the customer 112. Additionally, the credit service transactions database 504 stores transaction information of each rewards program provider as associated with each one or more customers 112. In one embodiment, the resolution engine generates reports and analytics based on transaction information associated with each loyalty program provider 110. In such an embodiment, the reports can include the number of transactions completed per period such as daily, weekly, monthly, quarterly, etc. In another embodiment, the resolution engine generates advertisement campaign analytics. For example, the analytics report can include the number of redemption that occurred based on the ad campaign, the number of associated sales in numbers and volumes that were executed after a customer is presented with promotions. Thus, the resolution engine can update the aggregate view of loyalty points available to customer 112.

The customer transactions database 502 stores the transaction information of each customer 112 associated with the rewards payment processor 106. The merchant transactions database 506 stores transaction information for each redemption entity 102 as it relates to each one or more customers 112 and rewards program provider 110. The resolution engine 314 aggregates the data and serves the data on a web page accessible by a customer 112, such that a customer can review all the loyalty points available to the customer 112 from several different rewards program providers 110 from one web page view. For example, the resolution engine 314 inserts a page view of the loyalty points available to a customer 112 within a web page published by a redemption entity 102. In another embodiment, the resolution engine 314 the aggregated view of loyalty points available to the customer 112 from several rewards program providers 110 during the check-out process of an ecommerce transaction. In other embodiments, the resolution engine 314 provides additional information such as the amount of money saved by using loyalty points, the number of transaction completed using loyalty points, the historical redemption value associated with each rewards program provider, etc. As such, the resolution engine 314 generally provides a better customer experience as it reinforces the value in accumulating loyalty points to purchase items that the customer 112 needs or desires.

Similarly, the publisher transactions database 508 stores transaction information associated with each redemption entity 102. In one embodiment, the resolution engine 314 uses the publisher transactions database 508 to generate redemption reports and analytics for redemption entities 102. For example, the reports can include the volume and size of transactions completed per period, transaction per customer 112, transaction per SKU or virtual good. Additionally, the resolution engine 314 generates a savings reports indicating the savings achieved from using the rewards payment processor 106 over other payment systems such as credit card etc. In one embodiment, the analytics report can also include the estimated amount of money made possible by using the rewards payment processor's 106 services.

Process for Using Loyalty Points to Execute a Purchase

Figure 6:
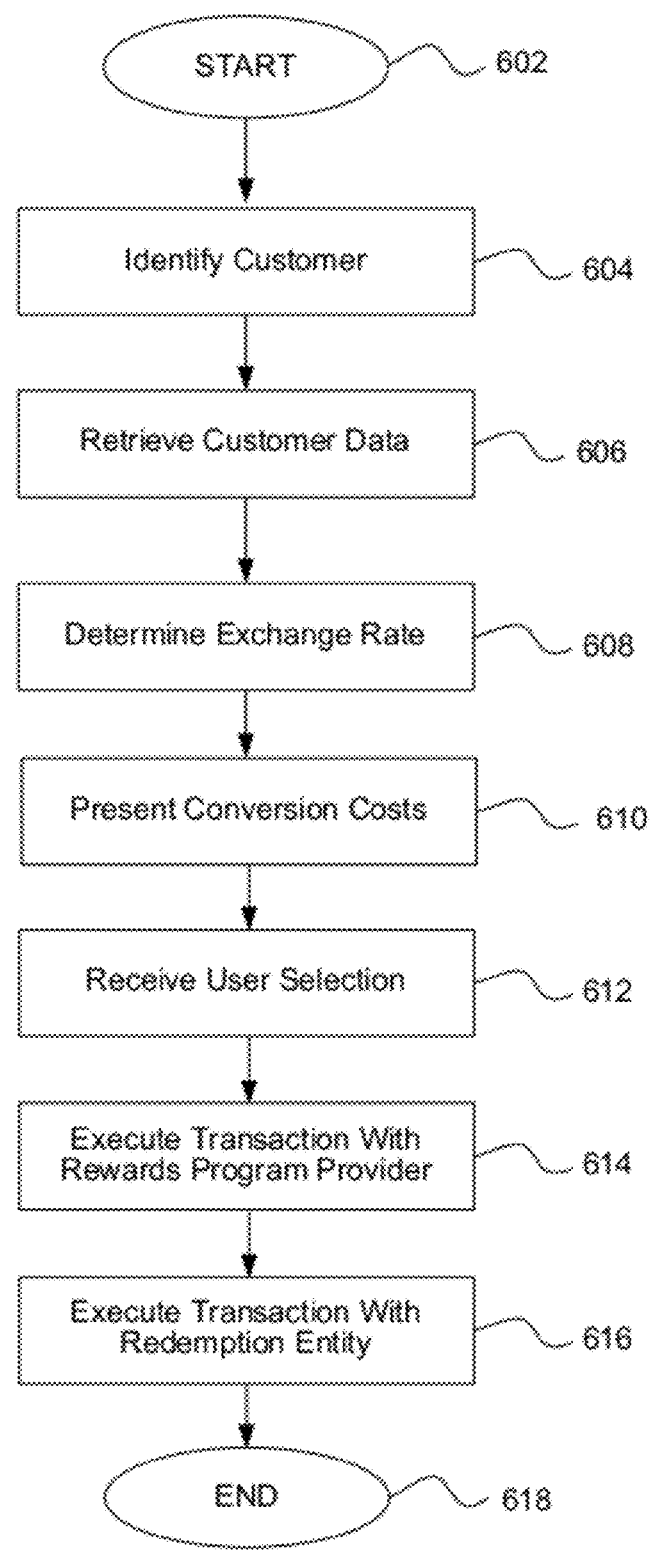
FIG. 6 is a flowchart illustrating a method of executing a transaction with loyalty points according to one embodiment.

FIG. 6 is a flow chart illustrating the operation of a rewards payment processor 106 according to one embodiment of a representative transaction where a customer 112 selects an item for purchase and indicates the use of accumulated loyalty points offered by a rewards program provider 110 to execute the purchase. Those of skill in the art will recognize that other embodiments can perform the steps of FIG. 6 in different orders. Moreover, other embodiments can include different and/or additional steps than the ones described herein.

Figure 10:
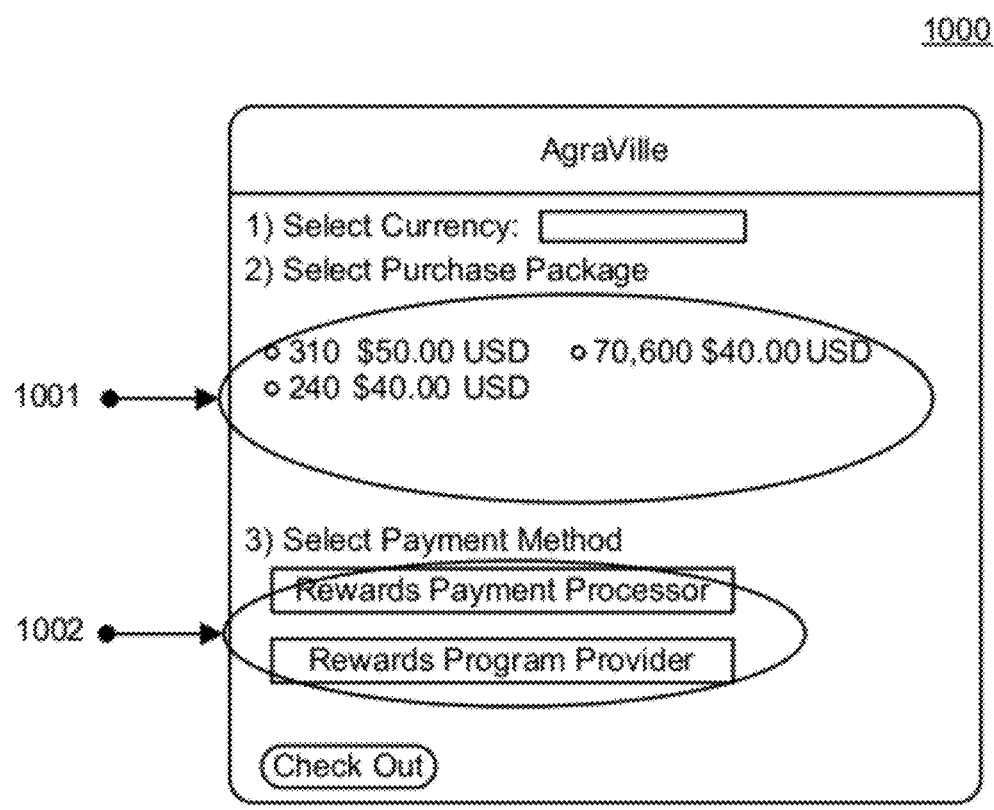
FIG. 10 illustrates an exemplary customer interface presented by a customer computing device for selecting a loyalty points transaction according one embodiment.

Initially, the process starts 602 once a user decides to purchase an item from a redemption entity 102 and selects to make a payment for the purchase via a rewards payment processor 106. As described in FIG. 10, several payment methods 1002 may be listed on a redemption entity's webpage, wherein the user can optionally select a rewards payment processor 106 to execute the purchase. FIG. 10 is described in greater detail in the specification. The rewards payment processor 106 identifies 604 the customer. A customer may be identified 604 based on customer name and password provided by the customer and associated with an account created with the rewards payment processor 106. In another embodiment, the customer 112 may be identified based on the credit service account number provided by the customer. In other embodiments, the process verifies the customer identity by retrieving user data from the data engine 318 or the accounts engine 412. For example, if a user is typically associated with a particular IP address or a geo tagging location, the user can be validated. In another embodiment, the process provides a set of questions to the customer 112. If the customer answers match previously provided ones or answers available to a rewards program provider 110, the customer identity is validated. If the questions are not answered correctly or the accounts engine 412 detects fraud, the customer identity is not verified 604. In one embodiment, the accounts engine 412 associates a rewards program provider account 110 with a user's reward payment processor account 106. For example, the accounts engine 412 may store a user's one or more rewards program provider accounts 110 in a database such that a user can later select from his or her various stored rewards program provider accounts 110 anytime the user accesses his or her rewards payment processor account 106.

The process retrieves 606 customer data associated with the identified customer 112. In one embodiment, customer data such as the customer provided rewards program providers 110 the customer is associated with is retrieved. Additionally, the number of available loyalty points associated with each retrieved rewards program provider is also retrieved. In other embodiments, additional customer data such as any data gathered by the data engine 318 is also retrieved.

The process determines 608 the redemption rate for one or more rewards program providers 110 available or selected by the customer to execute a transaction with a redemption entity 102. A transaction can include a purchase of one or more items selected by a customer 112. A transaction can also include the shipping costs and taxes associated with the purchase of one or more items. In other embodiments, the transaction includes only the shipping costs associated with the purchase of an item. In one embodiment, the redemption rate is provided by the rewards program provider 110. In other embodiments, as described with reference to FIG. 4, other mechanism to determine the redemption rate with a transaction currency. In one embodiment, the redemption rate may vary based on the purchase price or the identity of the product being purchased. In such instances, the process determines 608 virtual currency amount in substantially real time.

The process presents 610 the total conversion cost for executing a purchase through the use of accumulated loyalty points. In one embodiment, the process determines the total check-out cost for purchasing an item, including taxes, shipping fees and any other fees applied by the redemption entity 102 or a third party broker. Additionally, the process determines additional fees that may be applied by the rewards program provider 110 or the rewards payment processor 106. The total purchase price and all included fees are used to determine the final transaction cost. The transaction cost and the redemption rate is used to determine the number of loyalty points needed to complete the transaction. Once the number of points needed is determined, the information is presented 610 to the customer 112. In other embodiments, other methods of determining the total transaction costs may be used. For example a profit sharing model may be used instead of fees to determine the cost of transaction. In other embodiments, the transaction costs may be pegged to certain indicators such as volume of transaction, currency redemption rates, money market rates, etc. In other embodiments, the process presents 610 the number of loyalty points needs execute the purchase for all credit service programs available to the customer 112.

The rewards payment processor receives 612 a customer input selecting loyalty points associated with one or more rewards program providers 110. In one embodiment the customer selection may comprise of choosing points associated with a particular rewards program provider 110 to execute a purchase. In another embodiment, the customer selection may comprise choosing a particular amount of points insufficient to execute a purchase. In such an embodiment, the customer 112 may provide additional funds through traditional credit card or check payment sources. For example, the process may prompt a user to provide a payment method for a remaining sum to purchase an item. In one embodiment, the payment prompt may be similar to item 1002 depicted in FIG. 10. The user may thereafter select a payment method and the payment processing may be handled an entity selected by the customer, such as a rewards program provider, a traditional credit card provider, a bank, etc.

The rewards payment processor executes 614 a transaction with the rewards program provider 110. In one embodiment, the process may require a customer to provide additional confirmation prior to executing the transaction. Once customer approval is received by the rewards payment processor 106, the transaction engine 312 executes 614 a transaction with the rewards program provider 110. In one embodiment, the transaction comprises the total transaction cost described above, including any additional fees associated with the purchase transaction. In other embodiments, the transaction cost comprises the number of loyalty points a customer 112 elects to process towards the purchase cost. The transaction with the rewards program provider 110 is described in greater detail in reference to FIG. 4.

The rewards payment processor executes 616 a transaction with the merchant. In one embodiment, once a confirmation of an executed transaction with the rewards program provider is received, the process executes 616 a transaction with the merchant. In another embodiment, the two transactions a performed independent or simultaneously with each other. The transaction with the merchant comprises sending payment data from the rewards payment processor to the redemption entity 102 or the broker handling the sale. Once the transaction with the redemption entity is executed 616, the redemption entity may provide a confirmation of the sale to the user including a receipt and a confirmation number. In other embodiments, the rewards payment processor may provide a confirmation of the transaction and a receipt including the remaining balance of rewards points available to the user. Once both transactions are executed, the process ends 618.

Figure 7:
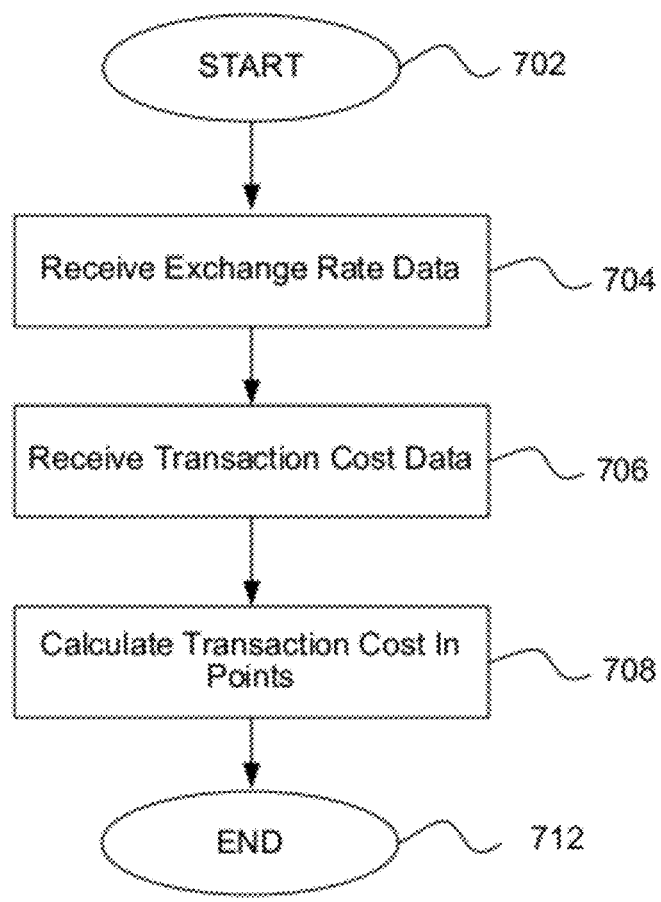
FIG. 7 is a flowchart illustrating a method of calculating an redemption rate according to one embodiment.

FIG. 7 is a flow chart illustrating the operation of an redemption engine 314 according to one embodiment of a representative transaction where a customer 112 selects an item for purchase and indicates the use of accumulated loyalty points offered by a rewards program provider 110 to execute the purchase. Those of skill in the art will recognize that other embodiments can perform the steps of FIG. 7 in different orders. Moreover, other embodiments can include different and/or additional steps than the ones described herein.

The process starts 702 once the redemption engine receives 704 redemption rate data. In one embodiment, the redemption rate data is received from the rewards program provider 110. In other embodiments, the redemption rate data may be received from one or more other sources.

The redemption engine receives 706 the total transaction cost associated with the purchase of an item by using loyalty points. As described in greater detail below, the transaction cost data includes all associated fees with all parties in executing the transaction with the redemption entity 102, rewards program provider 110 and the redemption rate service provider 106.

The redemption engine calculates 708 the number of loyalty points needed to execute the purchase of one or more selected items. The calculation 708 is performed by combining the transaction cost and the redemption rate. In other embodiments, the process 600 calculates the amount of money that can be used towards the purchase of an item based on the number of selected points. Once the calculation 708 is performed the process ends 712.

Figure 8:
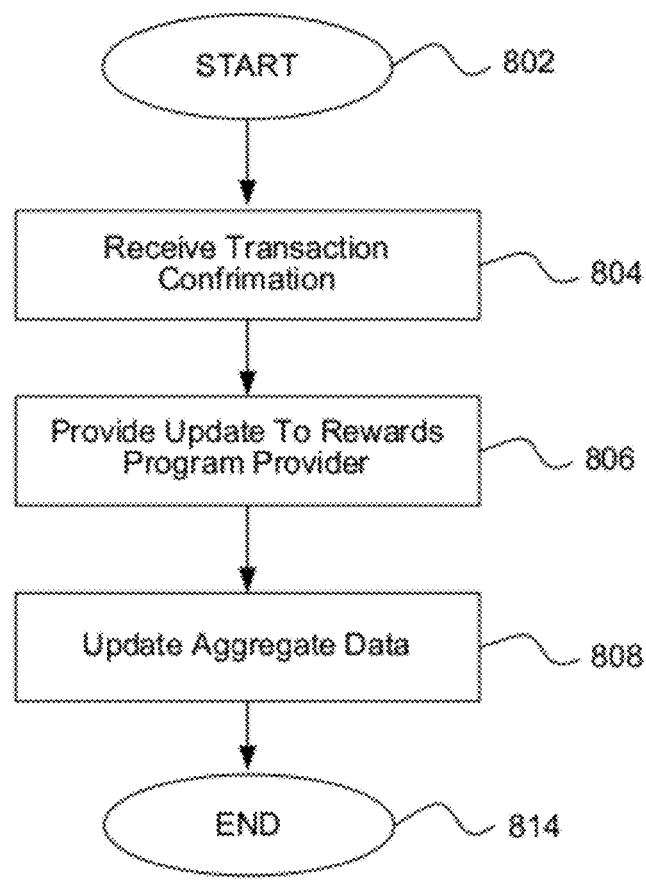
FIG. 8 is a flowchart illustrating a method of updating transaction accounts according to one embodiment.

FIG. 8 is a flow chart illustrating the operation of resolution engine 314 according to one embodiment of a representative transaction where a customer 112 selects an item for purchase and indicates the use of accumulated loyalty points offered by a rewards program provider 110 to execute the purchase. Those of skill in the art will recognize that other embodiments can perform the steps of FIG. 8 in different orders. Moreover, other embodiments can include different and/or additional steps than the ones described herein.

The process starts 802 once a transaction with the rewards program provider 110 is complete. In one embodiment, the resolution engine 314 receives 804 a transaction confirmation from the transaction engine 312. The process determines the number of loyalty points used from rewards program provider 110.

Additionally, the process provides 806 an update to the rewards program providers, including an account of the number of loyalty points used from the transaction. Thus, if a customer 112 used ten loyalty points in a transaction, the process instructs 806 the rewards program provider 110 to reduce the customer's outstanding loyalty points by ten points. In some embodiment, the process accesses the rewards program provider's databases to perform a confirmation check to determine if the number of loyalty points was reduced by an appropriate amount.

The process also updates 808 the aggregate data compiled by the rewards payment processor 106. As described above, the rewards payment processor 106 maintains a customer's points balance with one or more rewards program provider 110 such that the customer can view all the outstanding points balances in one web page view. Thus the process updates 808 the database used to generate and provide the aggregated web page view of a customer's outstanding points. The process ends 814 once the aggregate database is updated.

Figure 9:
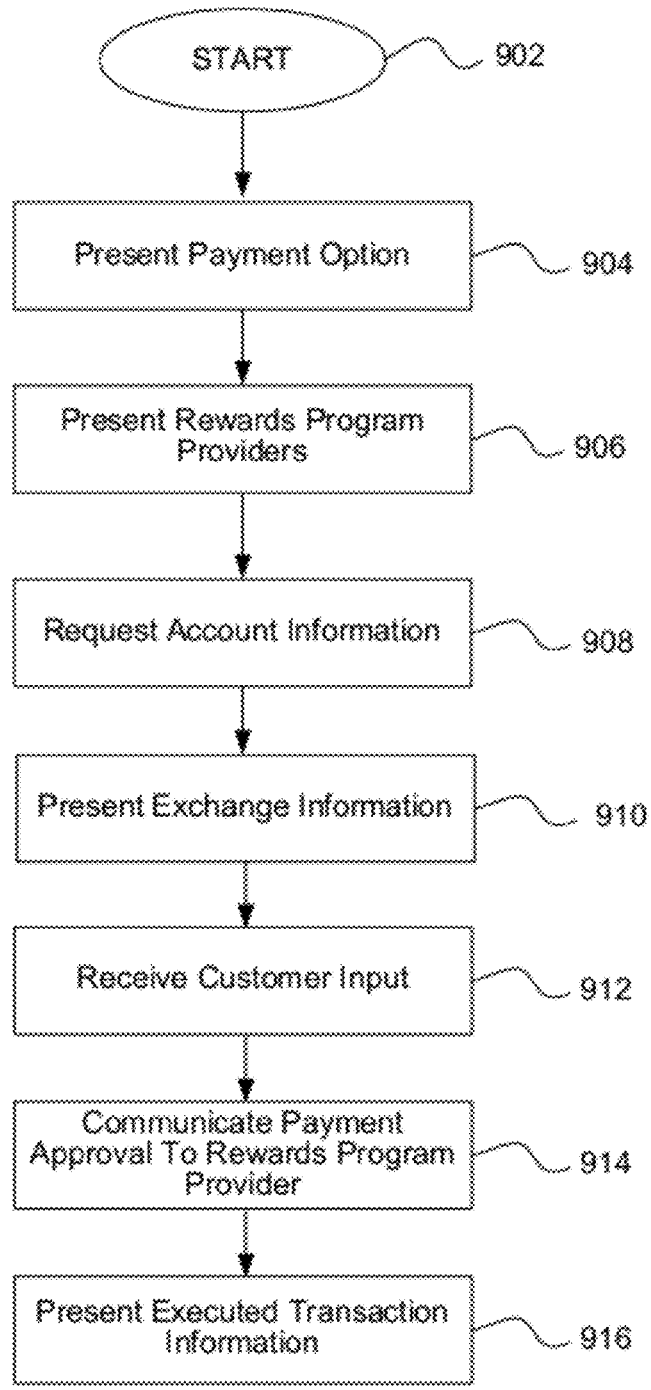
FIG. 9 is a flowchart illustrating a method of executing a loyalty points transaction according to one embodiment.

FIG. 9 is a flow chart illustrating the operation of a redemption entity 102 according to one embodiment of a representative transaction where a customer 112 selects an item for purchase and indicates the use of accumulated loyalty points offered by a rewards program provider 110 to execute the purchase. Those of skill in the art will recognize that other embodiments can perform the steps of FIG. 9 in different orders. Moreover, other embodiments can include different and/or additional steps than the ones described herein.

The process starts 902 once a customer selects an item to purchase. In one embodiment, the process presents 904 the customer with one or more payment options. In one embodiment, the payment options include one or more rewards program providers 110 or rewards payment processors 106. In one embodiment, the rewards payment processor 106 is the only payment method presented to the customer. An exemplary illustration of a webpage presenting 904 a rewards payment processor as a payment option is shown in FIG. 10.

Referring now to FIG. 10, a webpage 1000 can be served by a redemption entity 102. In one embodiment, a redemption entity 102 can include social networking systems such as FACEBOOK as illustrated in FIG. 10. FACEBOOK, as depicted in FIG. 10 is a registered trademark of Facebook Inc. In another embodiment, the redemption entity can include a game application executing on a social networking system's webpage, such as AgraVille executing on a FACEBOOK webpage. Other embodiments can include other redemption entities as described above in reference to FIG. 1, including social networking games such as FARMVILLE, MAFIA WARS, FRONTIERVILLE, merchants such as AMAZON.COM, ITUNES STORE, etc. In one embodiment, the redemption webpage 1000 includes a list of items 1001 a customer can purchase using rewards points. For example, as illustrated in FIG. 10 a customer can purchase AgraCash 1001 or AgraCoins 1001 from the AgraVille redemption entity 102. In other embodiments, other items can be available for purchase. In one embodiment, the redemption webpage 1000 includes one or more methods of payment 1002. The methods of payments can include one or more rewards payment processors 106 or rewards program providers 110. FIG. 10 illustrates rewards program providers 110 including VISA, MASTERCARD, AMEX, DISCOVER, PAYPAL, PAYPAL and FACEBOOK wherein the logos illustrated in FIG. 10 are registered trademarks of Visa Inc., MasterCard Inc., American Express Inc., Discover Inc., Paypal Inc. and Facebook Inc. respectively. Rewards payment processors 106 illustrated as KOINZ, whose logo is a registered trademark of Koinz Inc., can also be included as a payment option 1002 in an embodiment.

Figure 11:
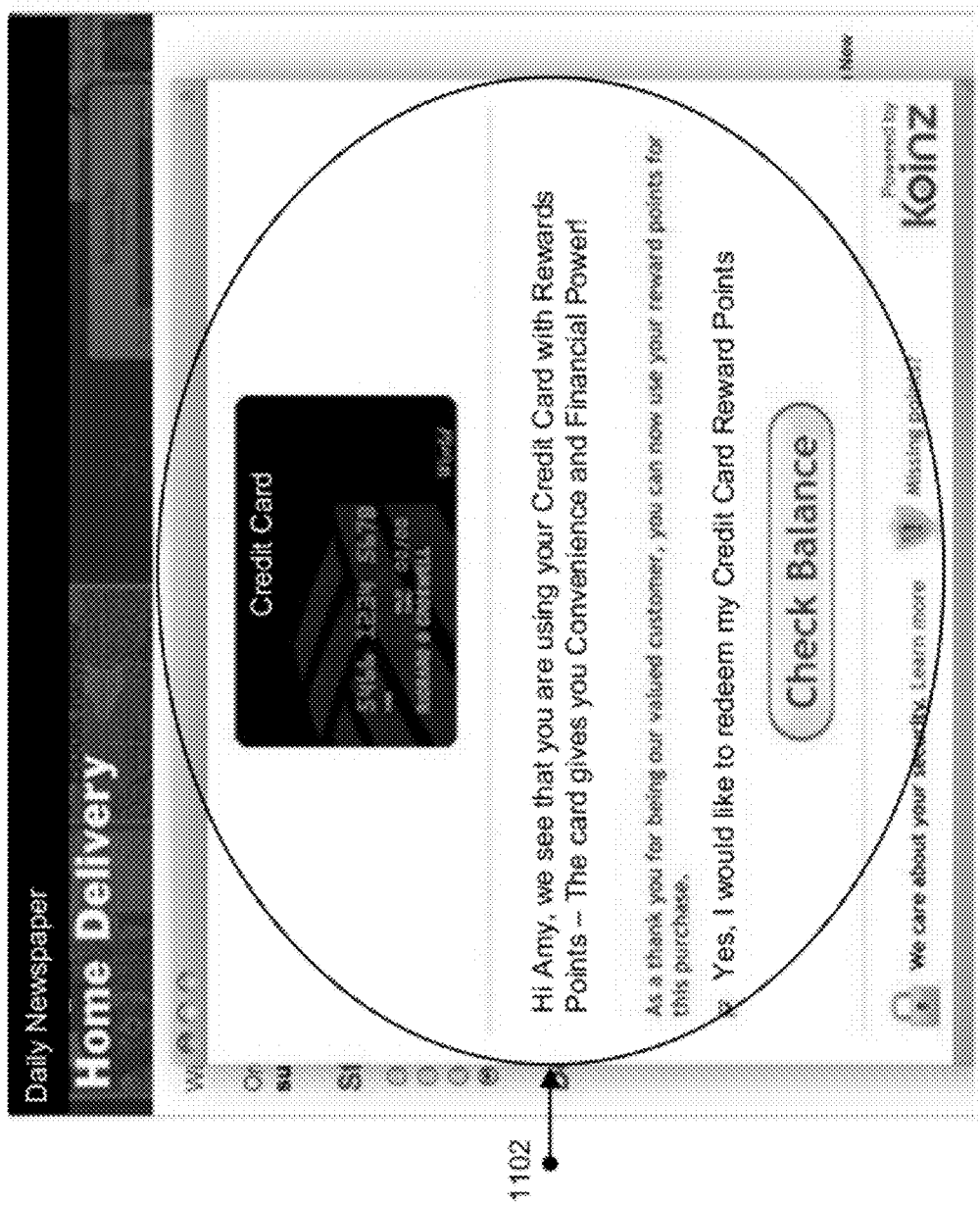
FIG. 11 illustrates an exemplary customer interface presented by a customer computing device for presenting loyalty programs to a customer according to one embodiment.

In another embodiment the customer 112 is presented with payment options 904, wherein the customer can enter a credit card number or other payment information. In such an embodiment, the process 900 receives the payment information and determines if the information is associated with a rewards program provider 110. For example, if a customer 112 enters a credit card number to execute a purchase, the process 900 can determine if the Bank Identification Number (BIN) is associated with a rewards program provider 110. If the payment information entered by the customer 112 is associated with a rewards program provider 110, the process 900 notifies the customer 112. An exemplary user interface notifying the customer of rewards points associated with customer provided payment information is illustrated in FIG. 11. As illustrated in FIG. 11, a pop-up window 1102 is presented to the customer responsive to receiving customer payment information within the underlying redemption entity's webpage 102. In one embodiment, the pop-up window 1102 prompts the customer to check the balance of loyalty points available to the customer 112 as illustrated in FIG. 11. In other embodiment, the pop-up window 1102 provides a prompt to the customer suggesting that the purchase transaction can be completed by redeeming rewards points. In other embodiments, the pop-up window 1102 prompts the customer 112 to create an account with the rewards payment processor 106. In such an embodiment, the customer can input additional rewards program information available to the customer 112.

Referring now to FIG. 9, in one embodiment, the process presents 906 the customer 112 with a list of rewards program providers to select from. In one embodiment, if the customer chooses a rewards payment processor 106 such as KOINZ as a payment option, the process 900 presents 906 rewards program providers 110 associated with KOINZ. In other embodiments, a a list of rewards program providers 110 is presented 906 to the customer regardless of the payment option selection.

Figure 12:
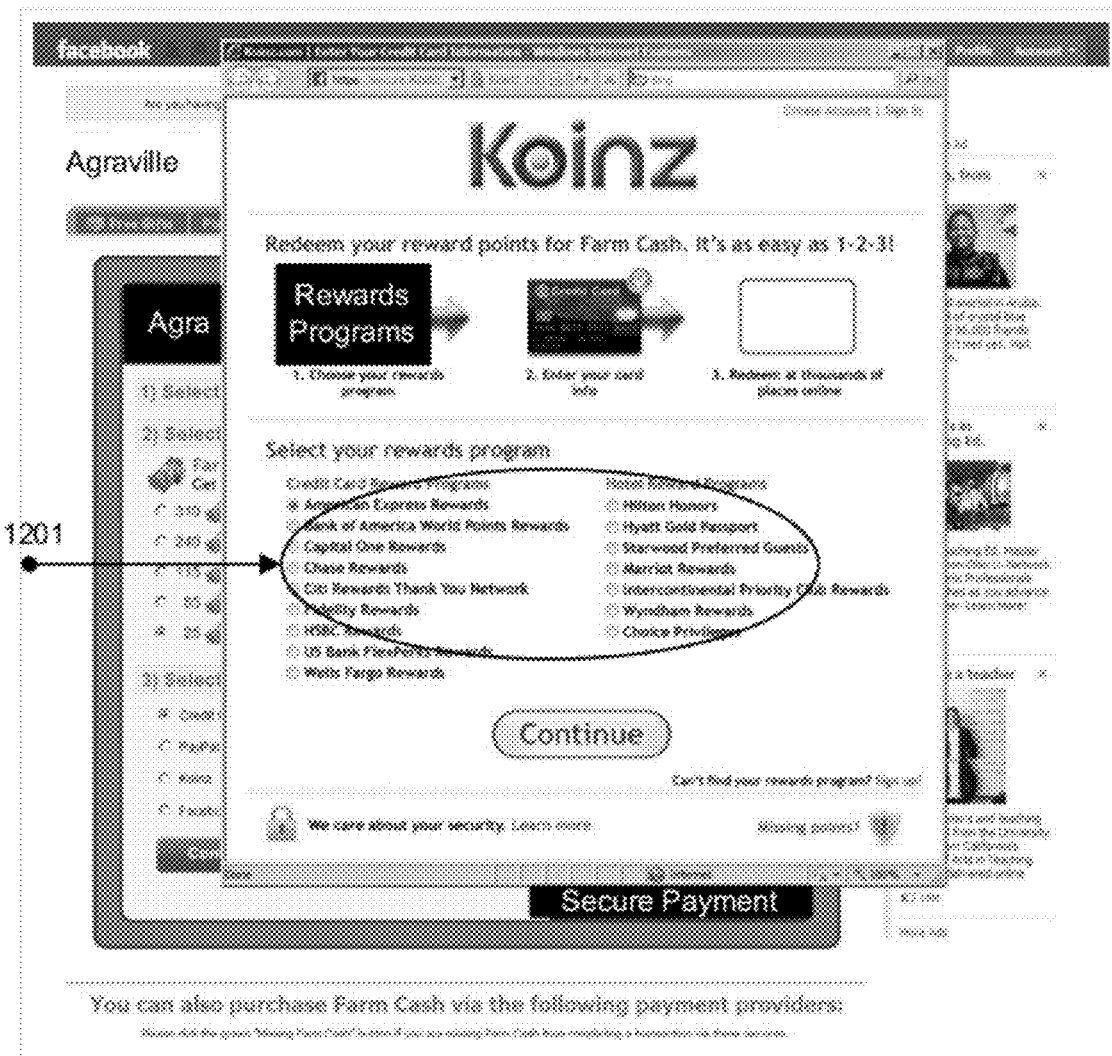
FIG. 12 illustrates an exemplary customer interface presented by a customer computing device for presenting loyalty points redemption option according to one embodiment.

FIG. 12 is an exemplary illustration of a user interface including a list 1201 of rewards program providers 110 presented to a customer. In one embodiment, list 1201 of rewards program providers can be pre-selected for a particular customer responsive to a customer or computer identification. A customer can be identified using a number of different methods, such as the use of tracking cookies or IP address can be used to identify a particular customer. In another embodiment, only the rewards program providers with whom the customer has accumulated points are presented 906 to the customer. As illustrated in FIG. 12, the customer is provided with a listing 1201 of rewards program providers in a pop-up interface, responsive to selecting an item for purchase and selecting a payment method on the AgraVille game application interface executing on the FACEBOOK webpage. Rewards program providers 110, illustrated as "Credit Card Rewards Program" and "Hotel Rewards Program" in FIG. 11 as AMERICAN EXPRESS REWARDS, BANK OF AMERICA WORLD POINTS REWARDS, CAPITAL ONE REWARDS, CHASE REWARDS, CITI REWARDS THANK YOU NETWORK, FIDELITY REWARDS, HSBC REWARDS, US BANK FLEXPERKS REWARDS, WELLS FARGO REWARDS, HILTON HONORS, HYATT GOLD PASSPORT, STARWOOD PREFERRED GUESTS, MARRIOT REWARDS, INTERCONTINENTAL PRIORITY CLUB REWARDS, WYNDHAM REWARDS AND CHOICE PRIVELGES are registered trademarks of American Express Inc., Bank of America Inc., Capital One Inc., Chase Inc., CitiBank Inc., Fidelity Inc., HSBC Inc., US Bank Inc., Wells Fargo Inc., Hilton Worldwide Inc, Intercontinental Hotels Group Inc., Travel Rewards Inc. and Choice Hotels International Inc., respectively. It should be noted that many more rewards program providers can be added to the customer interface and provided to the customer. However a few are shown here for purposes of illustration.

Referring again to FIG. 9, the process requests 908 additional customer information regarding each selected rewards program provider 110. In order to purchase an item with loyalty points, the customer provides some confirmation that the customer is the authorized holder of the account. In one embodiment, the customer may provide an account number and a password, in another embodiment, the customer may provide an email address associated with the account. In such an embodiment, a confirmation number may be emailed to the customer. Other methods of confirmation may be used in other embodiments.

Once the customer's account information is verified the customer is presented with information on how many loyalty points are required to execute the desired purchase. The process retrieves redemption data from the redemption engine 314. The process of generating the redemption information is described in greater detail above in reference to FIG. 6. In an embodiment where the customer has selected one credit service account, the redemption data for that credit service account is provided. In an embodiment where the customer has selected multiple credit service accounts, the redemption information for each credit service account is presented.

The process continues once a customer inputs information indicating a confirmation to execute the purchase transaction. In order to execute the transaction the process communicates 914 the payment approval to the rewards payment processor 106 to debit the user's rewards account. Once the rewards payment processor 106 completes transactions with the rewards program provider 110 and the redemption entity 102, the process presents 916 the executed transaction information to the customer.

The configurations described provide several advantages and benefits to using a rewards program provider's website to earn and redeem loyalty points. For example, the configurations described herein provide benefits of redeeming loyalty points. A customer 112 can redeem loyalty points associated with several redemption service providers to purchase of an item offered by any retail or ecommerce merchant. Thus a customer is no longer required to use loyalty points to redeem limited number of items generally offered by rewards program providers. Additionally, the configurations described provide a seamless system to redeem loyalty points. The configuration described herein retrieve a customer's loyalty program account information responsive a customer providing his or her Credit Card information, rewards program account information or a number of other identity identifiers. For example, the system and the process retrieve customer information such as the number of loyalty points available to the customer, the redemption rate available in redeeming the loyalty points, the number of loyalty points required to execute a purchase of selected items etc. Additionally the system provides functionality to allow a customer to use loyalty points towards a portion of a purchase, such as towards shipping costs, one or more items within a shopping list or a shopping cart or other fees associated with a purchase.

Figure 13:
FIG. 13 illustrates an exemplary customer interface presented by a customer computing device for presenting rewards offers according to one embodiment.

In addition to redeeming points, the configuration described herein provide the additional benefit of allowing a customer to earn loyalty points and allowing a rewards program provider to award points to certain users under certain circumstances. In one embodiment, a customer 112 executing a transaction using loyalty points is presented with an opportunity to earn additional points during the execution of the transaction. For example, a user being sent paper bills can be offered an opportunity to switch to paperless billing to earn additional loyalty points. As such, the configurations described also allow a rewards program provider to target certain customers or influence customer behavior. For example, a rewards program provider 110 can provide an advertisement allowing the user to earn double rewards points if the customer purchases a stay with a partner hotel network. FIG. 13 illustrates an example of a user interface wherein a customer 112 is offered to earn loyalty points for signing up for offered opportunities. For example, a cusstomer may be offered an opportunity to earn points 1301 by signing up for BILL PAY, paperless statements options, etc. Additionally, the customer may be offered special rewards offers 1302 for executing a purchase or a transaction with a partner or affiliated rewards program provider, such as WORLD POINTS, STARWOOD PREFERRED GUESTS, etc.

The configurations described also provide the benefit of allowing a rewards program provider to generate good will and a loyal customer base by allowing its customers to redeem accumulated loyalty points with many merchants of goods and services. Using the configurations described herein, a rewards program provider can offer better redemption rates, discounts or other special programs to entice customers in redeeming their loyalty points and thereby clearing the outstanding loyalty points associated with the program. Thus, a rewards program provider can clear funds associated with the use of a loyalty reserve accounts and removing the associated real liability from their balance sheets. The configuration described also provide a benefit of allowing a merchant to sell physical or virtual goods and services to any customer with accumulated loyalty points, thereby potentially increasing a merchant's sale volume and customer base.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic and referenced as engines (or engines), for example, in FIGS. 3, 4 and 5. Engines (or engines) may constitute either software engines (e.g., code embodied on a machine-readable medium or in a transmission signal) or hardware engines. A hardware engine is tangible unit capable of performing certain operations and may be configured or arranged in a certain manner. In example embodiments, one or more computer systems (e.g., a standalone, client or server computer system) or one or more hardware engines of a computer system (e.g., a processor or a group of processors) may be configured by software (e.g., an application or application portion) as a hardware engine that operates to perform certain operations as described herein.

In various embodiments, a hardware engine may be implemented mechanically or electronically. For example, a hardware engine may comprise dedicated circuitry or logic that is permanently configured (e.g., as a special-purpose processor, such as a field programmable gate array (FPGA) or an application-specific integrated circuit (ASIC)) to perform certain operations. A hardware engine may also comprise programmable logic or circuitry (e.g., as encompassed within a general-purpose processor or other programmable processor) that is temporarily configured by software to perform certain operations. It will be appreciated that the decision to implement a hardware engine mechanically, in dedicated and permanently configured circuitry, or in temporarily configured circuitry (e.g., configured by software) may be driven by cost and time considerations.

Accordingly, the term "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where the hardware engines comprise a general-purpose processor configured using software, the general-purpose processor may be configured as respective different hardware engines at different times. Software may accordingly configure a processor, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple of such hardware engines exist contemporaneously, communications may be achieved through signal transmission (e.g., over appropriate circuits and buses) that connect the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines (or engines) that operate to perform one or more operations or functions, e.g. as described in FIGS. 3, 4, and 5. The engines referred to herein may, in some example embodiments, comprise processor-implemented engines.

Similarly, the methods described herein may be at least partially processor-implemented. For example, at least some of the operations of a method may be performed by one or processors or processor-implemented hardware engines. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented engines may be located in a single geographic location (e.g., within a home environment, an office environment, or a server farm). In other example embodiments, the one or more processors or processor-implemented engines may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for an electronic currently transaction processing configuration using rewards or loyalty points (or credits) through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for conducting an ecommerce purchase between a merchant and a customer using reward points available to the customer through a plurality of reward program providers, the method comprising:
    identifying, by a computer system, a number of reward points from the plurality of reward program providers available to the customer, the reward points accumulated by the customer from the plurality of reward program providers;
    determining, by the computer system, a plurality of redemption rates for redeeming the reward points from each of the plurality of reward program providers to a transaction currency, the transaction currency accepted by the merchant to execute the purchase;
    combining, by the computer system, the available reward points from the plurality of reward program providers based on the plurality of redemption rates;
    determining a number of reward points required from a combination of the plurality of reward program providers to execute the purchase between the customer and the merchant based on the plurality of redemption rates and a purchase price;
    selecting, by the computer system, reward points from a combination of the plurality of reward program providers to use during a transaction;
    executing a redemption transaction with the plurality of selected reward program providers, the redemption transaction comprising redeeming the determined number of reward points from the plurality of selected reward program providers for the transaction currency at the plurality of determined redemption rates, the redemption transaction for at least one of the purchase price and the reward points available to the customer; and
    executing the purchase transaction with the merchant in the transaction currency based on the redemption transaction.

2. The computer-implemented method of claim 1, further comprising:
    providing the combined reward points to the customer in a user interface.

3. The computer-implemented method of claim 2, wherein the user interface includes an analytics report including at least one of amount of reward points used by the customer, an amount of money saved by the customer by redeeming reward points and proportion of reward points used with a merchant.

4. The computer-implemented method of claim 1, further comprising combining the reward points from at least two reward program providers to determine the number of reward points available to the customer.

5. The computer-implemented method of claim 1, wherein the plurality of redemption rates are provided by at least one of a market and the plurality of reward program providers.

6. The computer-implemented method of claim 1, wherein the plurality of redemption rates are variable and determined based on at least one of merchant identity and items selected for purchase by the customer.

7. The computer-implemented method of claim 6, wherein the plurality of redemption rates comprise a promotional rate offered by at least one of the merchant, the plurality of reward program providers and a reward payment processor.

8. The computer-implemented method of claim 1, wherein the number of reward points required to execute a purchase transaction comprise fees, including fees charged by at least one of the merchant, a reward payment processor and the plurality of selected reward program providers.

9. The computer-implemented method of claim 8, wherein the number of reward points redeemed include a purchase price, taxes, shipping costs and the fees.

10. The computer-implemented method of claim 8, further comprising sending a total transaction cost to the customer, the total transaction cost including a purchase price and the fees, the total transaction cost presented to the customer in reward points redeemed from the plurality of selected reward program providers and transaction currency.

11. The computer-implemented method of claim 1, further comprising receiving customer authorization to use reward points from the plurality of selected reward program providers to execute the purchase transaction, the customer authorization providing additional account authorization information.

12. The computer-implemented method of claim 1, further comprising:
generating a sub-account associated with the customer, the sub-account providing authorization for another user to redeem the customer's reward points,
and including spending limits provided by the customer.

13. A system for conducting an ecommerce purchase between a merchant and a customer using reward points available to the customer through a plurality of reward program providers, the system comprising:
a computer processor for executing executable computer program code;
a computer-readable storage medium containing the executable computer program code for performing a method comprising:
identifying a number of reward points from the plurality of reward program providers available to the customer, the reward points accumulated by the customer from the plurality of reward program providers;
determining a plurality of redemption rates for redeeming the reward points from each of the plurality of reward program providers to a transaction currency, the transaction currency accepted by the merchant to execute the purchase;
combining, by the computer processor, the available reward points from the plurality of reward program providers based on the plurality of redemption rates;
determining a number of reward points required from a combination of the plurality of reward program providers to execute the purchase between the customer and the merchant based on the plurality of redemption rates and a purchase price;
selecting reward points from a combination of the plurality of reward program providers to use during a transaction;
executing a redemption transaction with the plurality of selected reward program providers, the redemption transaction comprising redeeming the determined number of reward points from the plurality of selected reward program providers for the transaction currency at the plurality of determined redemption rates, the redemption transaction for at least one of the purchase price and the reward points available to the customer; and
executing the purchase transaction with the merchant in the transaction currency based on the redemption transaction.

14. The system of claim 13, further comprising a computer-readable storage medium containing the executable computer program code for performing a method comprising:
providing the combined reward points to the customer in a user interface.

15. The system of claim 14, wherein the user interface includes an analytics report including at least one of amount of reward points used by the customer, an amount of money saved by the customer by redeeming reward points and proportion of reward points used with a merchant.

16. The system of claim 13, wherein the plurality of redemption rates are provided by at least one of a market and the plurality of reward program providers.

17. A computer program product for conducting an ecommerce purchase between a merchant and a customer using reward points available to the customer through a plurality of reward program providers, the computer program product comprising a non-transitory computer-readable storage medium containing computer program code executed by a computer processor for:
identifying a number of reward points from the plurality of reward program providers available to the customer, the reward points accumulated by the customer from the plurality of reward program providers;
determining a plurality of redemption rates for redeeming the reward points from each of the plurality of reward program providers to a transaction currency, the transaction currency accepted by the merchant to execute the purchase;
combining, by the computer processor, the available reward points from the plurality of reward program providers based on the plurality of redemption rates;
determining a number of reward points required from a combination of the plurality of reward program providers to execute the purchase between the customer and the merchant based on the plurality of redemption rates and a purchase price;
selecting reward points from a combination of the plurality of reward program providers to use during a transaction;
executing a redemption transaction with the plurality of selected reward program providers, the redemption transaction comprising redeeming the determined number of reward points from the plurality of selected reward program providers for the transaction currency at the plurality of determined redemption rates, the redemption transaction for at least one of the purchase price and the reward points available to the customer; and
executing the purchase transaction with the merchant in the transaction currency based on the redemption transaction.

18. The computer program product of claim 17, further comprising:
providing the combined reward points to the customer in a user interface.

19. The computer program product of claim 18, wherein the user interface includes an analytics report including at least one of amount of reward points used by the customer, an amount of money saved by the customer by redeeming reward points and proportion of reward points used with a merchant.

20. The computer program product of claim 17, wherein the plurality of redemption rates are provided by at least one of a market and the plurality of reward program providers.

* * * * *